US008287082B2

(12) United States Patent
Aoki et al.

(10) Patent No.: US 8,287,082 B2
(45) Date of Patent: Oct. 16, 2012

(54) METHOD OF DETECTING DISCHARGING STATE OF INKJET RECORDING HEAD

(75) Inventors: Takatsuna Aoki, Yokohama (JP); Hideo Kanno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/105,510

(22) Filed: May 11, 2011

(65) Prior Publication Data

US 2011/0211000 A1 Sep. 1, 2011

Related U.S. Application Data

(62) Division of application No. 12/205,204, filed on Sep. 5, 2008.

(30) Foreign Application Priority Data

Sep. 28, 2007 (JP) ................................ 2007-254449

(51) Int. Cl.
*B41J 29/393* (2006.01)
*G01F 1/68* (2006.01)

(52) U.S. Cl. ...................................... 347/19; 73/204.25

(58) Field of Classification Search ................ 73/204.25
See application file for complete search history.

(56) References Cited

U.S. PATENT DOCUMENTS

| | | | | |
|---|---|---|---|---|
| 3,905,230 | A * | 9/1975 | Calvet et al. | 73/204.17 |
| 4,501,145 | A * | 2/1985 | Boegli et al. | 73/204.17 |
| 4,550,327 | A | 10/1985 | Miyakawa | |
| 5,398,053 | A | 3/1995 | Hirosawa et al. | |
| 5,530,462 | A | 6/1996 | Takahashi et al. | |
| 6,174,039 | B1 | 1/2001 | Miyake et al. | |
| 6,454,379 | B1 | 9/2002 | Taneya et al. | |
| 7,255,427 | B2 | 8/2007 | Mataki | |
| 2005/0092078 | A1 * | 5/2005 | Ellis et al. | 73/204.25 |
| 2007/0116083 | A1 | 5/2007 | Oda et al. | |
| 2007/0229566 | A1 | 10/2007 | Takabayashi et al. | |
| 2007/0251292 | A1 | 11/2007 | Beck et al. | |

FOREIGN PATENT DOCUMENTS

| | | | |
|---|---|---|---|
| EP | 0 380 056 | A2 | 8/1990 |
| JP | 58-118267 | A | 7/1983 |
| JP | 2-194967 | A | 8/1990 |
| JP | 2-276647 | A | 11/1990 |
| JP | 6-79956 | A | 3/1994 |
| JP | 2000-343708 | A | 12/2000 |

OTHER PUBLICATIONS

Notice of Reasons for Refusal dated May 8, 2012, in Japanese Application No. 2007-254449.

* cited by examiner

*Primary Examiner* — Shelby Fidler

(74) *Attorney, Agent, or Firm* — Fitzpatrick, Cella, Harper & Scinto

(57) ABSTRACT

The discharging state of an inkjet recording head can be detected. The head includes a passage communicating with a discharge port for discharging ink, a discharging heater provided in the passage for generating energy to discharge ink from the discharge port, and a detecting unit provided in the passage for detecting a temperature of ink that changes in accordance with heat energy generated by the detecting unit and a flow of ink in the passage. The method includes supplying power to the heater, subsequently applying a first pulse current to the detecting unit, then applying a second pulse current with a smaller pulse width, and measuring and comparing an output signal from the detecting unit with a threshold to measure the ink temperature.

5 Claims, 13 Drawing Sheets

10

DRIVING PULSE

INK FLOW RATE
(DIRECTION OF OPEN ARROW IS POSITIVE DIRECTION)

PULSE APPLIED TO FLOW SENSOR

INK TEMPERATURE

OUTPUT VOLTAGE

DRIVING PULSE

INK FLOW RATE
(DIRECTION OF OPEN ARROW IS POSITIVE DIRECTION)

PULSE APPLIED TO FLOW SENSOR

INK TEMPERATURE

OUTPUT VOLTAGE

DRIVING PULSE

INK FLOW RATE
(DIRECTION OF OPEN ARROW IS POSITIVE DIRECTION)
NORMAL DISCHARGING
DEFECTIVE DISCHARGING
t12
t13
t14

PULSE APPLIED TO HEATER 22

PULSE APPLIED TO FLOW SENSORS 21, 23

OUTPUT VOLTAGE
NORMAL DISCHARGING
DEFECTIVE DISCHARGING

METHOD OF DETECTING DISCHARGING STATE OF INKJET RECORDING HEAD

This is a division of U.S. patent application Ser. No. 12/205,204, filed Sep. 5, 2008.

BACKGROUND OF THE INVENTION

1. Field of the Invention

The present invention relates to inkjet recording apparatuses, and more particularly, to an inkjet recording apparatus that can detect defective discharging. Herein, the term "recording" includes applications of ink (printing) to ink support materials such as cloth, strings, paper, and sheet materials. The term "recording apparatus" includes various information apparatuses and printers serving as output devices of the apparatuses.

2. Description of the Related Art

Along with the popularization of information processing apparatuses such as copying machines, word processors, and computers, recording apparatuses (inkjet recording apparatuses) that perform recording with an inkjet recording head have been rapidly popularized as output (recording) apparatuses for the information processing apparatuses.

In general, an inkjet recording apparatus includes a carriage on which a recording head and an ink tank are mounted, a conveying mechanism for conveying a recording medium, and a control circuit for controlling the carriage and the conveying mechanism.

When an ink discharging operation is not performed by the recording head for a long period, the viscosity of ink in an ink passage near a discharge port increases, and the ink is sometimes not discharged normally. Further, if a minute bubble, which grows in the ink in the ink passage for discharging, remains in the ink passage, normal ink discharging is sometimes difficult. This phenomenon of defective discharging due to the remaining bubble pronouncedly appears when the print duty is relatively high. In another case, a bubble enters the ink at a connecting portion of an ink supply passage or an ink supply system, and clogs the ink supply passage. This sometimes hinders normal discharging.

If recording failure is caused by the above-described defective ink discharging, the recording medium is wasted, and the time taken for recording is also wasted. If unclear images are continuously recorded in a so-called "faded recording" state caused immediately before defective discharging occurs, multiple recording media are wasted. Further, if recording is continued in the "faded recording" state, the recording head is heavily loaded, and this sometimes destroys the recording head itself.

In order to avoid the above-described trouble, various defective-discharging detecting devices have been proposed. A typical defective-discharging detecting device is an optical defective-discharging detecting device including a light-emitting portion and a light-receiving portion for receiving light from the light-emitting portion. In this optical defective-discharging detecting device, light from the light-emitting portion is blocked by ink droplets discharged from discharge ports. On the basis of the change in output of the light-receiving portion (change in amount of received light), defective discharging is detected.

Japanese Patent Laid-Open No. 2-194967 discloses an inkjet recording apparatus including an optical defective-discharging detecting device.

FIGS. 16A and 16B explain an operation of detecting defective discharging of ink. FIG. 16A is a schematic view showing a state in which ink discharged from a recording head passes through an optical path between a light-emitting portion and a light-receiving portion, and FIG. 16B is a waveform chart showing an output waveform from the light-receiving portion in this case. FIGS. 17A and 17B also explain an operation of detecting defective discharging of ink. FIG. 17A is a schematic view showing a state in which ink discharging is abnormal, and FIG. 17B is a waveform chart showing an output waveform from the light-receiving portion in this case.

Referring to these figures, a recording head 1 includes a plurality of ink discharge ports 2. Electrothermal transducers (heaters) 3 are provided in the corresponding passages (nozzles) communicating with the ink discharge ports 2. When a discharging pulse (rectangular pulse) for causing ink discharging is applied to an electrothermal transducer 3, ink in the corresponding passage is heated by heat energy from the electrothermal transducer 3. An ink droplet 2005 is thereby discharged from the corresponding ink discharge port 2.

As shown in FIG. 16A, the ink droplet 2005 discharged from an ink discharge port 2 passes through the optical path of light emitted from a light-emitting portion 2001 toward a light-receiving portion 2002. When passing through the optical path, the ink droplet 2005 blocks light from the light-emitting portion 2001, and the amount of light received by the light-receiving portion 2002 is thereby decreased. In this case, the level of an output signal 2006A from the light-receiving portion 2002 is lower than a threshold value 2004, as shown in FIG. 16B.

In contrast, when an ink droplet 2005 is not discharged from an ink discharge port 2, as shown in FIG. 17A, or when an ink droplet 2005 discharged from an ink discharge port 2 is too small, the amount of light received by the light-receiving portion 2002 does not change significantly. In this case, the level of an output signal 2006B from the light-receiving portion 2002 is higher than the threshold value 2004, as shown in FIG. 17B.

When the level of the output signal from the light-receiving portion 2002 is lower than or equal to the threshold value 2004 (the state shown in FIG. 16B), it is determined that the ink discharging operation is normal. In contrast, when the level of the output signal from the light-receiving portion 2002 is higher than the threshold value 2004 (the state shown in FIG. 16B), it is determined that the ink discharging operation is abnormal (defective discharging).

When it is determined that the ink discharging operation is abnormal, a carriage motor is controlled so as to move a carriage, on which the recording head 1 is mounted, to a position where a suction cap is provided. Then, a suction-cap motor is controlled so as to cap the ink discharge ports 2 of the recording head 1 with the suction cap, and ink is sucked from the recording head 1 by a suction pump. As necessary, the carriage motor is controlled so as to move the recording head 1 to a position where a cleaning plate is provided, and the ink discharge ports 2 are cleaned with the cleaning plate.

After ink suction, it is judged again whether the ink discharging operation is normal or abnormal. When it is determined again that the ink discharging operation is abnormal, a message indicating "abnormal" is displayed on a display (for example, an LCD) in the recording apparatus so as to urge the user to refill ink or to replace the recording head. When it is determined that the ink discharging operation is normal, recording is started.

A recording head disclosed in Japanese Patent Laid-Open No. 58-118267 is a liquid discharging device in which a plurality of nozzles are arranged, and in which conductors for detecting the change in temperature are provided in passages (nozzles) between the adjacent electrothermal transducers (beside the electrothermal transducers).

Unfortunately, the above-described inkjet recording apparatus has the following problems.

A plurality of ink droplets are simultaneously discharged from a plurality of discharge ports, and the change in output from the light-receiving portion caused when the ink droplets block the optical path is detected. Therefore, it is difficult to make judgment about defective discharging of ink with respect to each discharge port. It is conceivable to detect the change in output from the light-receiving portion by discharging an ink droplet from only one discharge port. In this case, however, the change in output from the light-receiving portion caused when one ink droplet blocks the optical path is small, and therefore, it is difficult to make an accurate judgment about defective discharging of ink. Further, the optical defective-discharging detecting device is susceptible to external light, which also makes detection of defective discharging difficult. In this way, it is difficult to make an accurate judgment about defective discharging with respect to each discharge port.

Moreover, a defective-discharging detecting operation cannot be performed during recording on a recording medium. For this reason, the user needs to perform a defective-discharging detecting operation before recording on the recording medium in order to check whether ink discharging failure has occurred in the inkjet recording head. This defective-discharging detecting operation decreases the throughput of the recording apparatus.

SUMMARY OF THE INVENTION

The present invention provides an inkjet recording head that overcomes the above-described problems and that can accurately detect ink discharging failure with a high throughput, and an inkjet recording apparatus using the inkjet recording head.

An inkjet recording head according to an embodiment of the present invention includes a passage communicating with a discharge port for discharging ink, an energy generating element, provided in the passage, for generating energy to discharge ink from the discharge port, and a detecting unit, provided in the passage, for detecting a temperature of ink that changes in accordance with heat energy generated by the detecting unit and a flow of ink in the passage.

An inkjet recording apparatus according to another embodiment of the present invention includes the above-described inkjet recording head; and a control unit configured to control driving of the inkjet recording head.

According to the present invention, an ink flow caused in the passage when discharging ink (ink flow caused by ink refilling) is detected. When discharging failure occurs, the flow of ink is smaller than during normal discharging. By utilizing this difference in magnitude of the ink flow, judgment can be made about ink discharging failure.

The magnitude of the ink flow in the case of discharging failure has a sufficiently distinguishable difference from that during normal discharging. Therefore, it is possible to accurately distinguish between normal discharging and defective discharging.

Further, the detection accuracy will not be reduced by external influence, unlike the optical defective-discharging detecting device. This allows for highly accurate detection.

Since the ink flow can be detected for each discharge port, judgment about discharging failure of the recording head can be made for each discharge port.

Still further, since judgment about discharging failure can be performed during normal ink discharging operation, the throughput of the recording apparatus is higher than that of a recording apparatus including an optical defective-discharging detecting device.

According to the present invention, the detecting unit generates heat energy in response to generation of energy by the energy generating element, and the temperature of the ink is then detected. Therefore, it is possible to further increase the accuracy in detecting ink discharging failure.

Further features of the present invention will become apparent from the following description of exemplary embodiments with reference to the attached drawings.

BRIEF DESCRIPTION OF THE DRAWINGS

FIG. 4A is a characteristic view showing how the output voltage changes when an ink flow is formed, and FIG. 4B is a characteristic view showing how the output voltage changes when there is no ink flow.

FIG. 7A is a schematic view showing the behavior of ink in the passage during normal discharging, and FIG. 7B is a schematic view showing the behavior of ink in the passage displayed when a discharge port is covered with extra ink and defective discharging is caused thereby.

FIG. 16A is a schematic view showing a state in which ink discharged from a recording head passes through the optical path between a light-emitting portion and a light-receiving portion, and FIG. 16B is a waveform chart showing an output waveform from the light-receiving portion.

FIG. 17A is a schematic view showing a state ink discharging is abnormal, and FIG. 17B is a waveform chart showing an output waveform from the light-receiving portion.

DETAILED DESCRIPTION OF THE EMBODIMENTS

Embodiments of the present invention will now be described with reference to the drawings.

Figure 14:
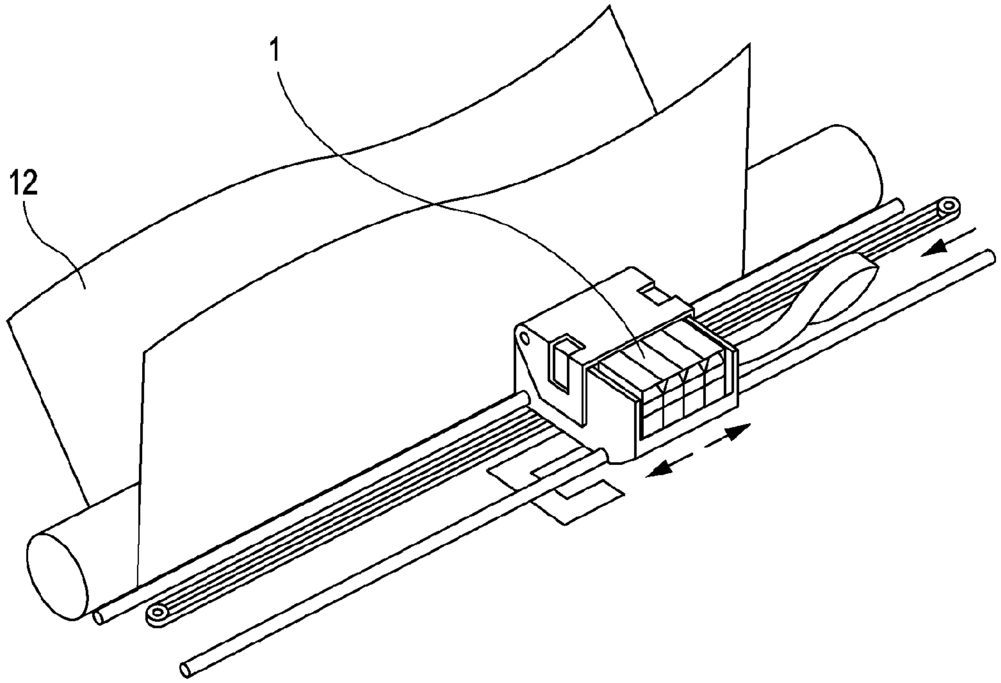
FIG. 14 is a schematic view showing structures of a recording head and its surroundings in an inkjet recording apparatus to which the present invention can be applied.

FIG. 14 is a schematic view showing structures of a recording head and its surroundings in an inkjet recording apparatus to which the present invention can be applied. Referring to FIG. 14, the inkjet recording apparatus is a serial inkjet color printer. The inkjet recording apparatus includes a recording head 1 having a plurality of lines of nozzles, and a carriage on which the recording head 1 is mounted. By discharging ink droplets from the recording head 1, an image is recorded on a recording medium 12.

Figure 15:
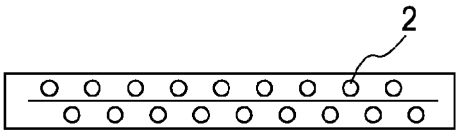
FIG. 15 is a schematic view of a surface of the recording head shown in FIG. 14 on which ink discharge ports are provided.
Figure 16A:
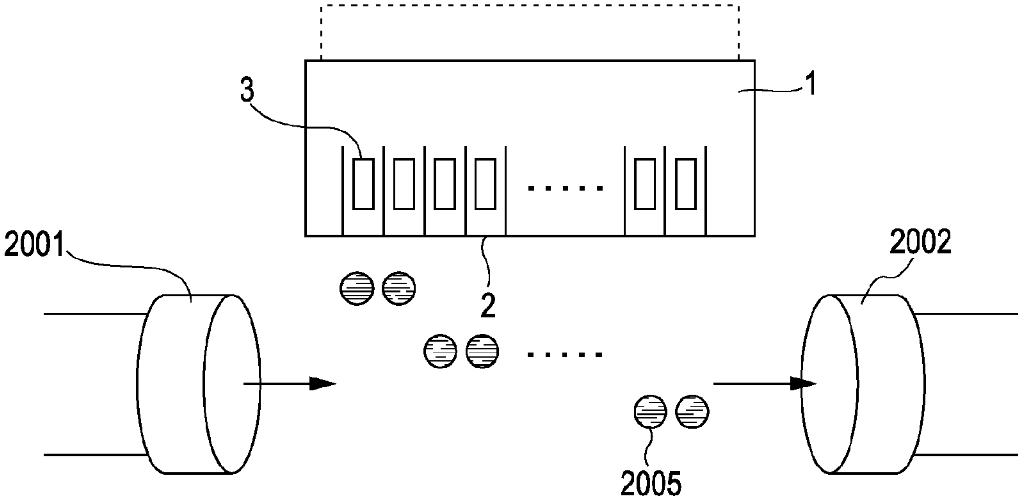
FIG. 16A PRIOR ART
FIGS. 16A and 16B explain a defective-discharging detecting operation performed in an inkjet recording head.
Figure 16B:
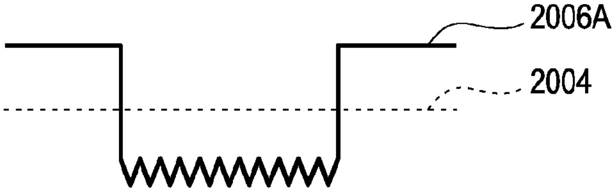
FIG. 16B PRIOR ART
Figure 17A:
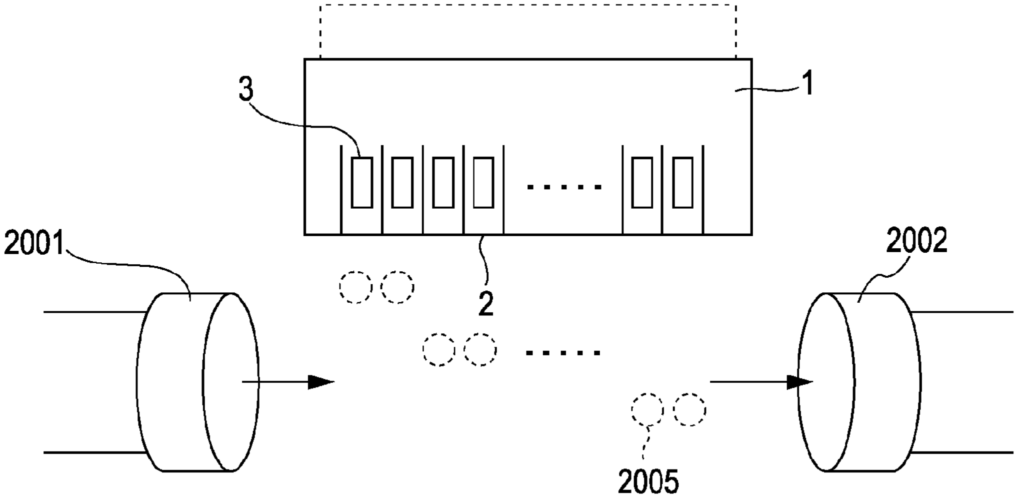
FIG. 17A PRIOR ART
FIGS. 17A and 17B explain a defective-discharging detecting operation performed in the inkjet recording head.
Figure 17B:
FIG. 17B PRIOR ART

FIG. 15 is a schematic view of a surface of the recording head 1 on which ink discharge ports 2 are provided. The ink discharge ports 2 are arranged in two lines and in a zigzag formation in the main scanning direction.

Although not shown in FIG. 14, the inkjet recording apparatus includes a control unit that controls the driving of the recording head 1. As the recording head 1, a recording head according to, but not limited by, any of the following first to fifth embodiments can be used. The control unit controls the operation of the entire inkjet recording apparatus, and also performs a recovery operation when ink discharging failure occurs in the recording head 1.

Recording heads according to embodiments of the present invention will be described below.

First Embodiment

Figure 1:
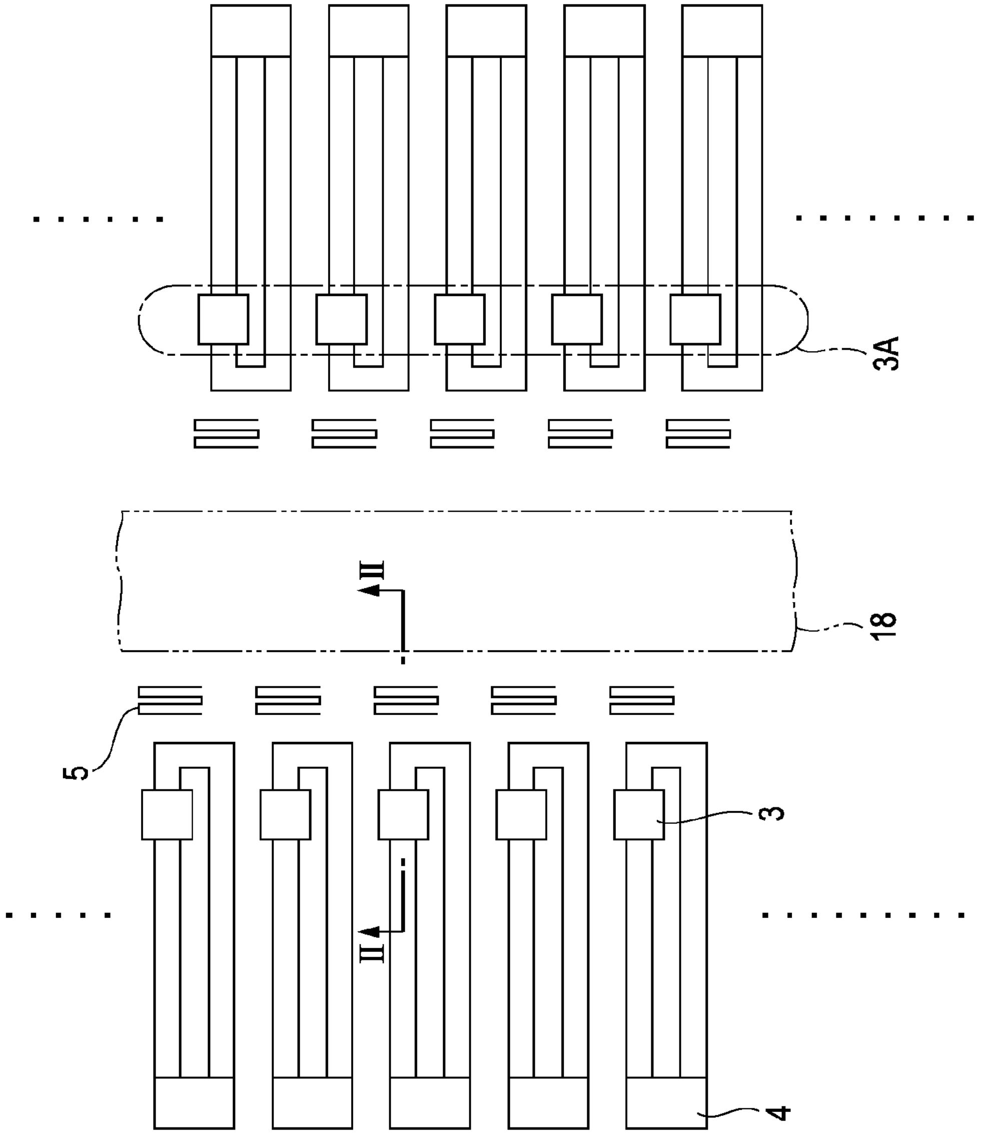
FIG. 1 is a schematic view showing a part of a substrate in an inkjet recording head according to a first embodiment of the present invention.
Figure 2:
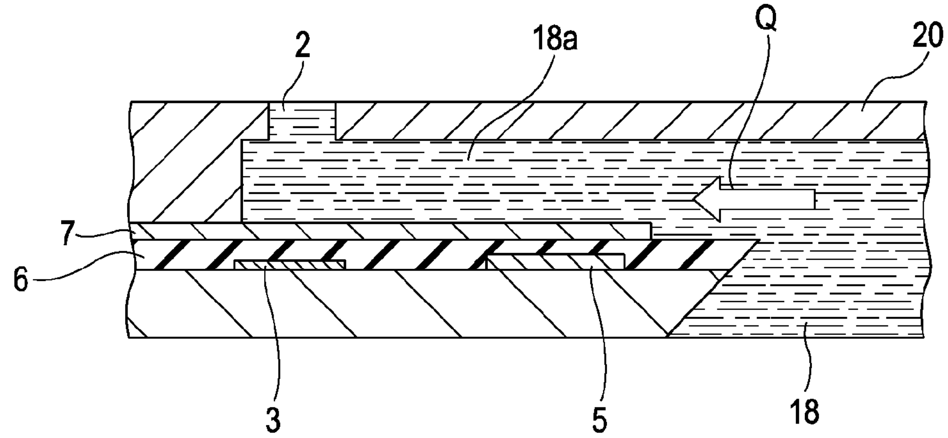
FIG. 2 is a cross-sectional view of the substrate, taken along line II-II in FIG. 1.

FIG. 1 is a schematic view showing a part of a substrate in an inkjet recording head according to a first embodiment of the present invention. FIG. 2 is a cross-sectional view of the substrate, taken along line II-II in FIG. 1.

Referring to FIG. 1, a heater board 10 has a structure in which a common liquid chamber 18 is provided at the center thereof, as viewed in a direction perpendicular to the board surface. On each side of the common liquid chamber 18 in the heater board 10, a heater unit 3A including a plurality of discharging heaters 3 arranged in line is provided.

Dummy resistors (not shown) are provided near the heater units 3A. The dummy resistors are not used for discharging of ink droplets. The discharging heaters 3 are electrothermal transducers (discharging-energy generating elements) that generate heat energy in accordance with the applied voltage, and are connected to terminals 4 to which a driving signal is applied. The terminals 4 are connected to external terminals (output terminals of a driving-signal supply circuit) by wire bonding. When a driving signal is applied to a terminal 4, the corresponding discharging heater 3 is driven.

The discharging heater 3 is provided in each passage communicating with a discharge port. Each passage communicates with the common liquid chamber 18, and incorporates a flow sensor 5 serving as a detecting element for detecting the change in ink flow in the passage.

As shown in FIG. 2, the discharging heater 3 and the flow sensor 5 can be provided on the same substrate surface. The flow sensor 5 can be formed as a film-shaped sensor by the same film deposition process as that for the discharging heater 3.

A protective film 6 serving as an insulating film is provided on the surface where the discharging heater 3 and the flow sensor 5 are provided, and a cavitation-resistant film 7 is provided on the protective film 6. By coupling the heater board 10 (first member) having the cavitation-resistant film 7 to a nozzle forming member 20 (second member), a passage 18*a* serving as a nozzle communicating with a discharge port 2 is formed. The passage 18*a* is provided on the cavitation-resistant film 7, and communicates with the common liquid chamber 18.

The discharging heater 3 is provided in a portion of the member that defines the passage 18*a* (heater board 10) facing the discharge port 2. When the discharging heater 3 is driven, heat energy generated by the discharging heater 3 is applied to ink in the passage 18*a*, and a bubble is thereby generated in the ink in the passage 18*a*. By the pressure of growth of the bubble, the ink is discharged from the passage 18*a* through the discharge port 2. This method for discharging ink by generating a bubble is generally called a bubble jet method.

After growing by heat energy, the bubble contracts. The cavitation-resistant film 7 prevents an impact caused by contraction of the bubble from being transmitted to the discharging heater 3 and the protective film 6. The cavitation-resistant film 7 is formed of a metal having a high melting point, for example, tantalum.

The flow sensor 5 is provided in a portion of the heater board 10 between the discharge port 2 and an ink supply port through which ink is supplied into the passage 18*a*. The flow sensor 5 detects the flow of ink in the passage 18*a*. Similar to other portions, the flow sensor 5 can be formed with high precision by a semiconductor film deposition process.

The flow sensor 5 is formed of a material whose resistance varies in accordance with the temperature. Specifically, the flow sensor 5 can be formed of, for example, aluminum, titanium, and tantalum that form the other components, or platinum, tantalum nitride, and titanium nitride that are frequently used as temperature-measuring resistors. Among these materials, aluminum can be used as an electrode. Tantalum can be provided at the top of the sensor in order to improve the resistance to cavitation. The line width of the sensor may be increased in order to reduce variations in wiring resistance in a process of forming the flow sensor. Further, in order to output a high voltage in response to even a slight temperature change, a wiring pattern of the sensor may have a meander shape that increases the resistance of the sensor.

Figure 3:
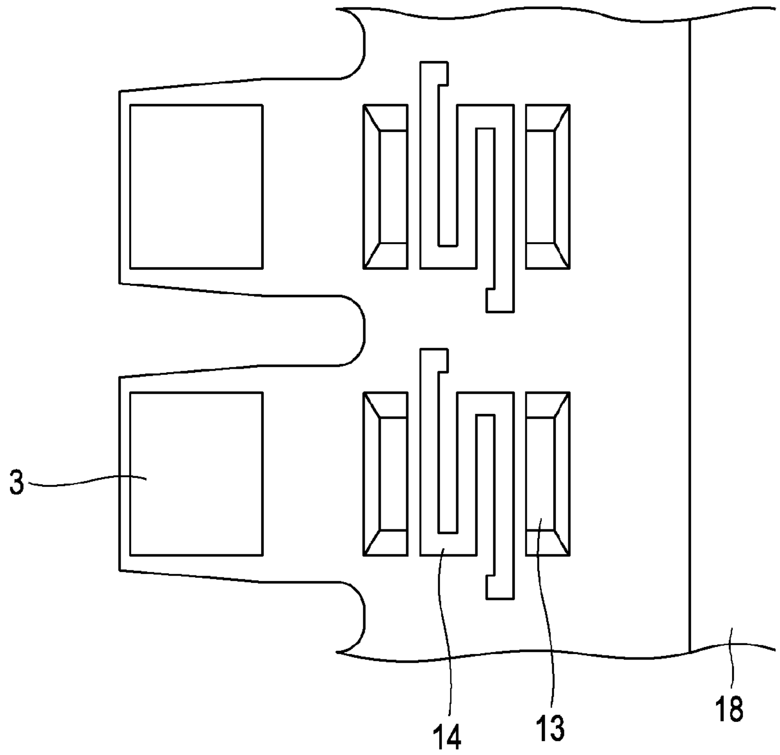
FIG. 3 is a plan view showing another structure of a flow sensor used in the inkjet recording head of the first embodiment.

While the flow sensor 5 is provided in the heater board 10 in the first embodiment, it may be provided at any position that allows detection of the ink flow in the passage 18*a* communicating with the discharge port 2. For example, as shown in FIG. 3, a flow sensor 14 may be provided in a bridge portion formed by anisotropic edging so as to be spatially insulated from the heater board 10. A pair of holes 13 are provided in the heater board 10 so as to oppose each other across the flow sensor 14. The holes 13 are connected in the heater board 10 so that a connecting portion therebetween passes under the bridge portion where the flow sensor 14 is provided.

The principle of operation of the flow sensor 5 will now be described.

Figure 4A:
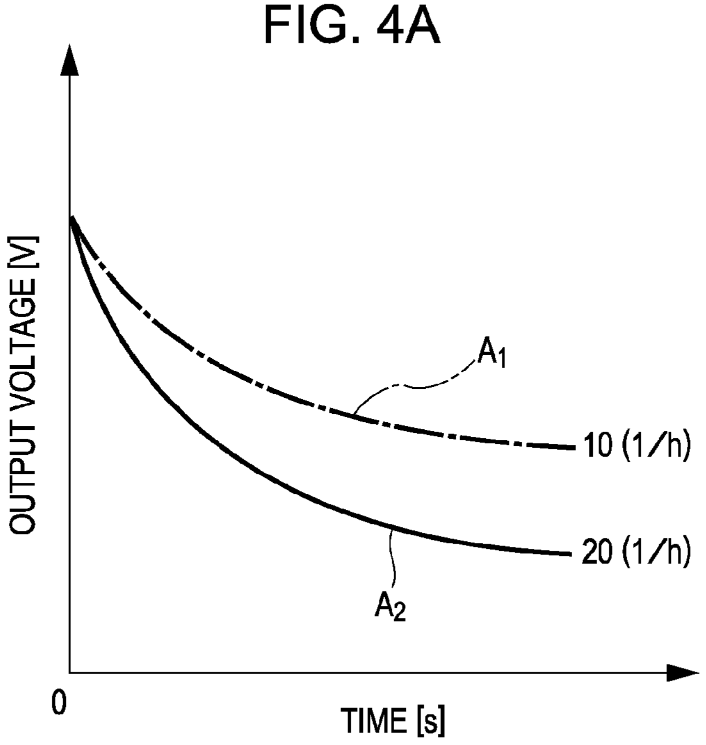
FIGS. 4A and 4B explain the principle of operation of the flow sensor in the inkjet recording head of the first embodiment.
Figure 4B:
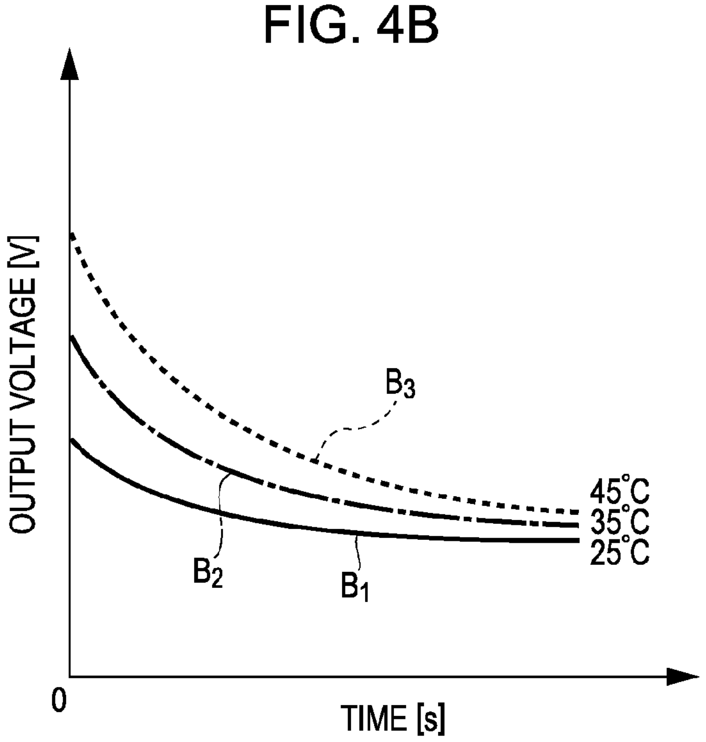

FIGS. 4A and 4B explain the principle of operation of the flow sensor 5. FIG. 4A is a characteristic view showing how the output voltage changes when there is an ink flow, and FIG. 4B is a characteristic view showing how the output voltage changes when there is no ink flow.

In FIG. 4A, a characteristic A1, shown by a one-dot chain line, indicates the change in output voltage of the flow sensor 5 made when the ink flow rate is 10 l/h, and a characteristic A2, shown by a solid line, indicates the change in output voltage of the flow sensor 5 made when the ink flow rate is 20 l/h. These characteristics A1 and A2 are obtained on the basis of the change in temperature (flow rate characteristic) of ink in the passage. The change in temperature is measured by the following procedure.

The temperature of ink in the common liquid chamber 18 is set at 25° C. When a current is supplied to the flow sensor 5, the flow sensor 5 generates heat, and ink in the passage 18*a* is heated by the energy of heat. After a first pulse current having a pulse width of a size that does not generate a bubble in the ink is passed through the flow sensor 5 to heat the ink in the passage 18*a*, the ink in the common liquid chamber 18 is made to flow in the direction of arrow Q in FIG. 2. Then, a second pulse current having a pulse width smaller than the pulse width of the first pulse current is passed through the flow sensor 5, and the change in temperature of ink on the flow sensor 5 in the passage 18*a* is detected. The second pulse current has an intensity of such a size that ink on the flow sensor 5 in the passage 18*a* is not heated by heat energy generated from the flow sensor 5 by the second pulse current.

The first pulse current and the second pulse current are passed through the flow sensor 5 in order, and the resistance of the flow sensor 5 is measured. In this case, since the temperature of the flow sensor 5 is rarely increased by the measuring currents, the output voltage of the flow sensor 5 varies in accordance with the temperature of ink near the flow sensor 5. When the ink flow rate is high, much ink having a temperature lower than that of the heated ink flows into the passage 18*a*, and therefore, the temperature of ink near the flow sensor 5 decreases. When the ink flow rate is low, the amount of exchanged heat is smaller than when the flow rate of refilled ink is high, and therefore, the temperature of ink near the flow sensor 5 does not decrease easily. In other words, the characteristics A1 and A2 indicate that it becomes easier to decrease the temperature and the amount of change in the resistance per unit time increases as the flow rate increases.

In contrast, when ink does not flow on the flow sensor 5, a first pulse current is passed through the flow sensor 5 to heat ink near the flow sensor 5, a second short pulse current is passed through, and the resistance of the flow sensor 5 is then measured. As a result, characteristics shown in FIG. 4B are obtained. In FIG. 4B, a characteristic B1, shown by a solid line, a characteristic B2, shown by a one-dot chain line, and a characteristic B3, shown by a broken line indicate temperature characteristics of the flow sensor 5 when the ink flow rate is zero. The characteristics B1, B2, and B3 respectively correspond to cases in which the temperatures of ink serving as fluid are 25° C., 35° C., and 45° C. As shown by the characteristics B1, B2, and B3, the resistance of the flow sensor 5 increases as the temperature of ink before the first pulse current is applied thereto increases, and the output voltage of the flow sensor 5 also increases in accordance with the ink temperature.

As described above, the surroundings (that is, ink) of the flow sensor 5 are heated by passing a first pulse current through the flow sensor 5. Then, a second pulse current having a pulse width smaller than the pulse width of the first pulse current is passed through the flow sensor 5, and a change in the temperature of the ink on the flow sensor 5 in accordance with the ink flow rate is detected. On the basis of the characteristic curves shown in FIGS. 4A and 4B, the change in the ink flow rate can be found from the output voltage (resistance) obtained when the second pulse current is applied.

Figure 5:
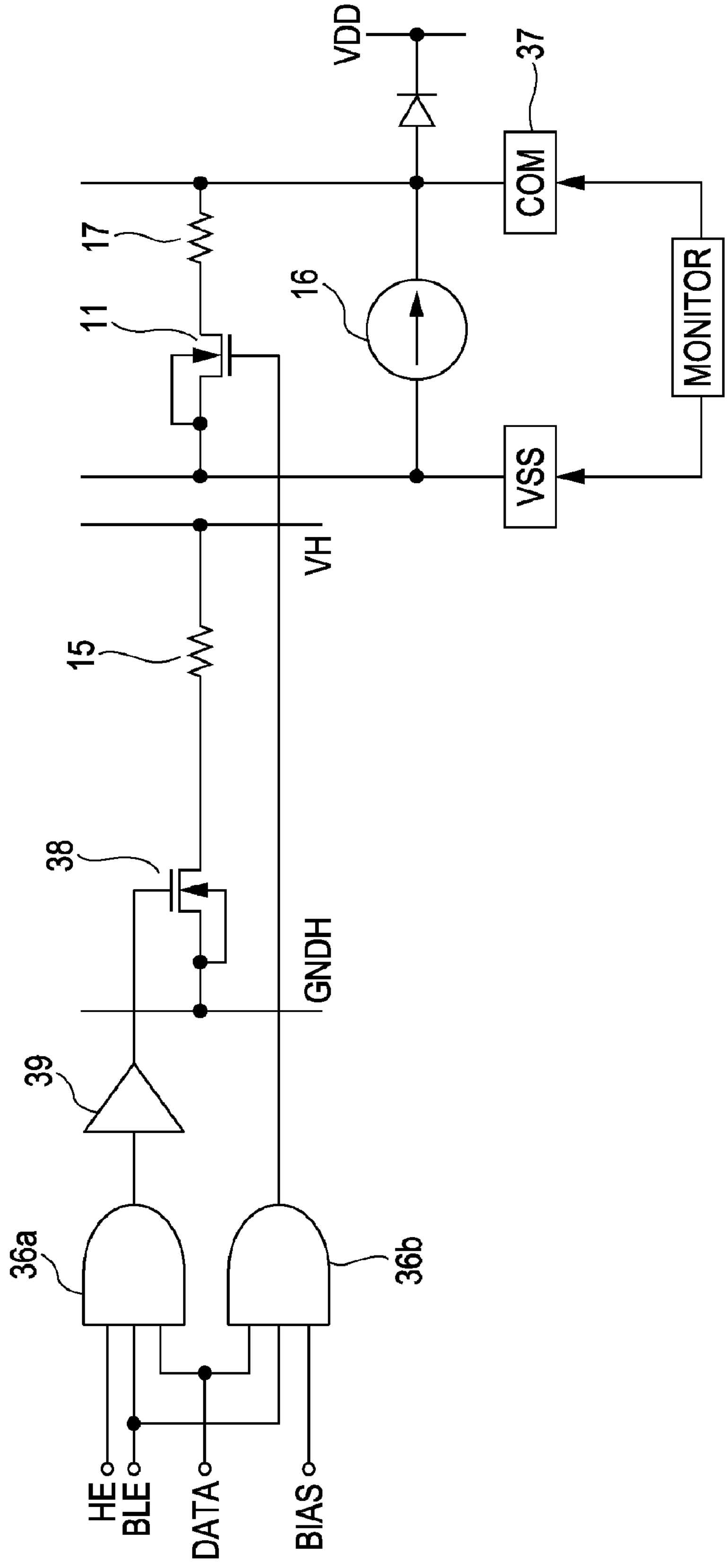
FIG. 5 is a block diagram of a driving circuit in an ink-flow detector used in the inkjet recording head of the first embodiment.

FIG. 5 shows a driving circuit of an ink-flow detector used in the inkjet recording head according to the embodiment of the present invention.

The driving circuit shown in FIG. 5 includes a detecting circuit for detecting an ink flow with a detecting element 17, and a control circuit for controlling the driving of an electrothermal transducer 15 and controlling a detecting operation of the detecting circuit in connection with the driving of the electrothermal transducer 15. The electrothermal transducer 15 corresponds to the discharging heater 3 shown in FIGS. 1 and 2. The detecting element 17 corresponds to the flow sensor 5 serving a heat-generating and temperature-measuring resistor shown in FIGS. 1 and 2, or the flow sensor 14 serving as a heat-generating and temperature-measuring resistor shown in FIG. 3. The control circuit is provided in each discharging nozzle (discharge port).

The detecting circuit is a constant-current driving circuit, and includes a constant-current source 16, a detecting element 17, and a MOS transistor 11. The constant-current source 16 and the detecting element 17 are connected in series via the MOS transistor 11. One end of the detecting element 17 is connected to one terminal of the constant-current source 16 and to a line of a voltage VSS via the MOS transistor 11. The other end of the detecting element 17 is connected to the other terminal of the constant-current source 16. A comparator circuit 37 is connected to a line that connects the other end of the detecting element 17 and the other terminal of the constant-current source 16.

One end of the electrothermal transducer 15 is connected to a ground line GNDH via a MOS transistor 38. The other end of the electrothermal transducer 15 is connected to a voltage supply line VH. The control circuit includes two AND circuits 36*a* and 36*b*. The AND circuit 36*a* receives a heater application signal HE, a block selection signal BLE, and recording data DATA, and ANDs these received data. The AND circuit 36*b* receives a block selection signal BLE, print data DATA, and a bias signal BIAS, and ANDs these received data. The output of the AND circuit 36*a* is supplied as a switch-element control signal to the MOS transistor 38 via an amplification circuit 39. The output of the AND circuit 36*b* is supplied as a switch-element control signal to the MOS transistor 11.

In the control circuit, a one-bit selection period is designated by a block selection signal BLE. Since recording data DATA is set at a high level (corresponding to "1") in the one-bit selection period, the output of the AND circuit 36*a* is high while the block selection signal BLE is high. During the period when the output of the AND circuit 36*a* is high, the MOS transistor 38 is turned on so as to supply a voltage to the electrothermal transducer 15.

A switch-element control signal output from the AND circuit 36*b* is high while a bias signal BIAS is high. During the period when the switch-element control signal is high, the MOS transistor 11 is turned on. When the MOS transistor 11 is on, a current is supplied from the constant-current source 16 to the detecting element 17.

In the detection circuit, the current is supplied to the detecting element 17 in synchronization with the flow of ink due to heat energy from the electrothermal transducer 15, and the change in ink flow is detected as a temperature change.

Specifically, an output voltage $V_{out}$ is detected at both ends of the detecting element 17 in the detection circuit. The MOS transistor 11 functions as a switch element. The MOS transistor 11 is turned on in synchronization with the ink flow so as to heat ink on the detecting element 17, and is then turned off. In synchronization with a predetermined timing while the ink is flowing or after the ink flow is completed, the MOS transistor 11 is turned on again, and the temperature of the ink on the detecting element 17 is measured. In this case, switching is made between a state in which the detecting element 17 functions as a heat-generating resistor and a state in which the detecting element 17 functions as a temperature-measuring resistor, by changing the pulse driving time of the detecting element 17.

While only one detecting circuit is adopted in the driving circuit shown in FIG. 5, normally, a plurality of detecting circuits are connected in parallel. One control circuit is provided for each detection circuit. In this case, detection signals from the detecting circuits (voltages $V_{out}$ output from both ends of the detection elements 17) are output in a time-sharing manner by performing control so that the MOS transistors 11 are sequentially turned on.

Figures 6A, 6B, 6C, 6D, 6E:
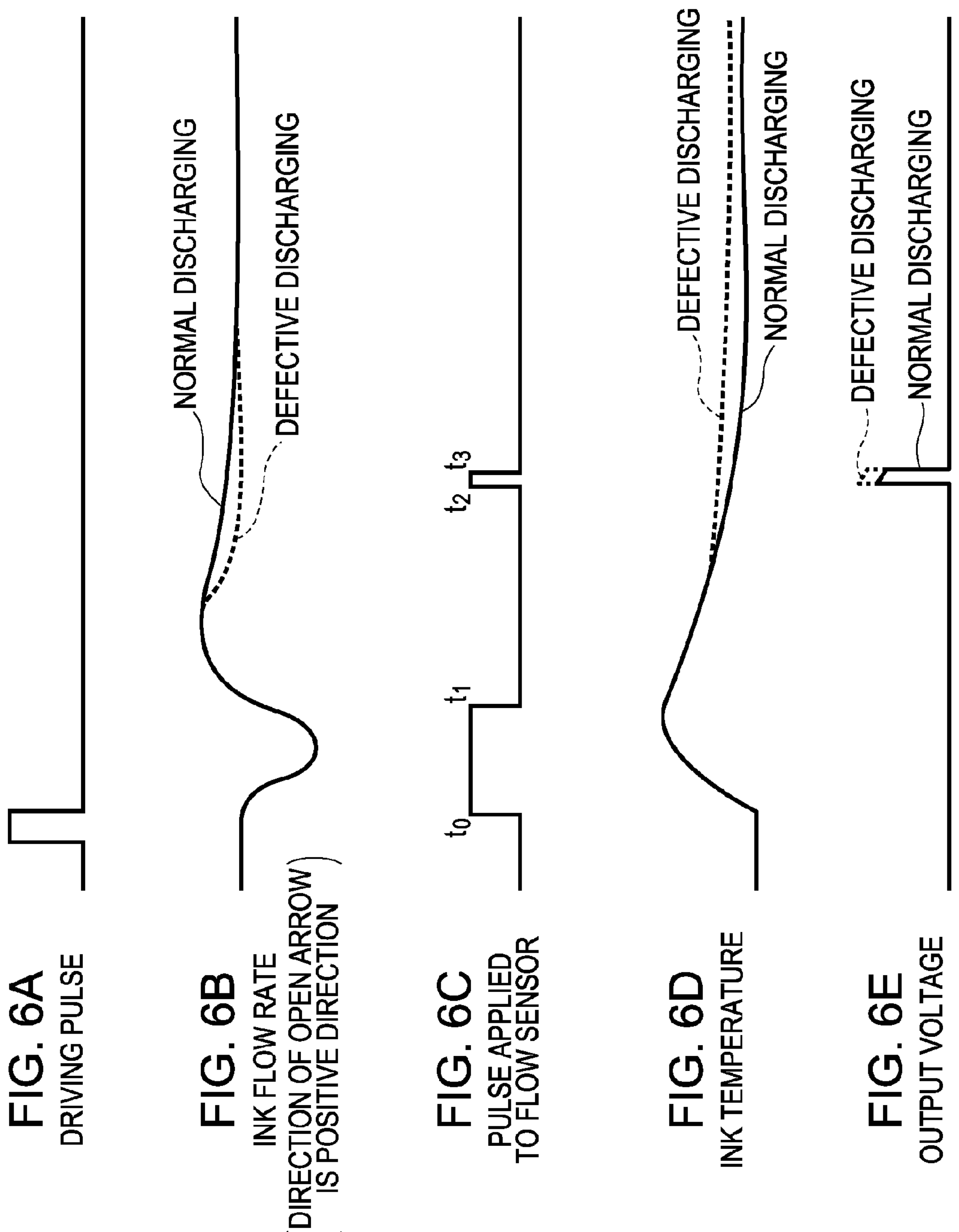
FIGS. 6A to 6E explain the principle of operation of the ink-flow detector shown in FIG. 5.

FIGS. 6A to 6E explain the principle of operation of the ink-flow detector shown in FIG. 5. FIG. 6A is a waveform chart of the voltage applied to the electrothermal transducer 15. FIG. 6B shows the change in ink flow rate on the time axis when the direction from the common liquid chamber 18 to the discharge port 2 shown in FIG. 1 is a positive direction. FIG. 6C is a waveform chart of the current applied to the detecting element 17. FIG. 6D shows the change in temperature on the time axis of ink on the detecting element 17. FIG. 6E is a waveform chart of the detected output voltage in accordance with the changes in ink flow rate and ink temperature shown in FIGS. 6B and 6D.

As shown in FIG. 6C, a pulse current supplied to the detecting element 17 includes a pulse that has a long pulse width P1 and is high during a period between a time $t_0$ and a time $t_1$, and a pulse that has a short pulse width P2 (<P1) and that is high during a period between a time $t_2$ and a time $t_3$. The pulse having the pulse width P1 and the pulse having the pulse width P2 are supplied at a predetermined interval. The period between the time $t_0$ and the time $t_1$ where the pulse current having the pulse width P1 is applied is a heating period for heating ink near the detecting element 17. The period between the time $t_2$ and the time $t_3$ when the pulse current having the pulse width P2 is applied is a detection time for detecting an ink flow by measuring the temperature of ink near the detecting element 17.

By supplying the driving pulse current shown in FIG. 6A to the electrothermal transducer 15, heat is generated by the electrothermal transducer 15, and a bubble is formed in the ink in the passage communicating with the ink discharge port. Consequently, an ink droplet is discharged from the ink discharge port.

Figure 7B:
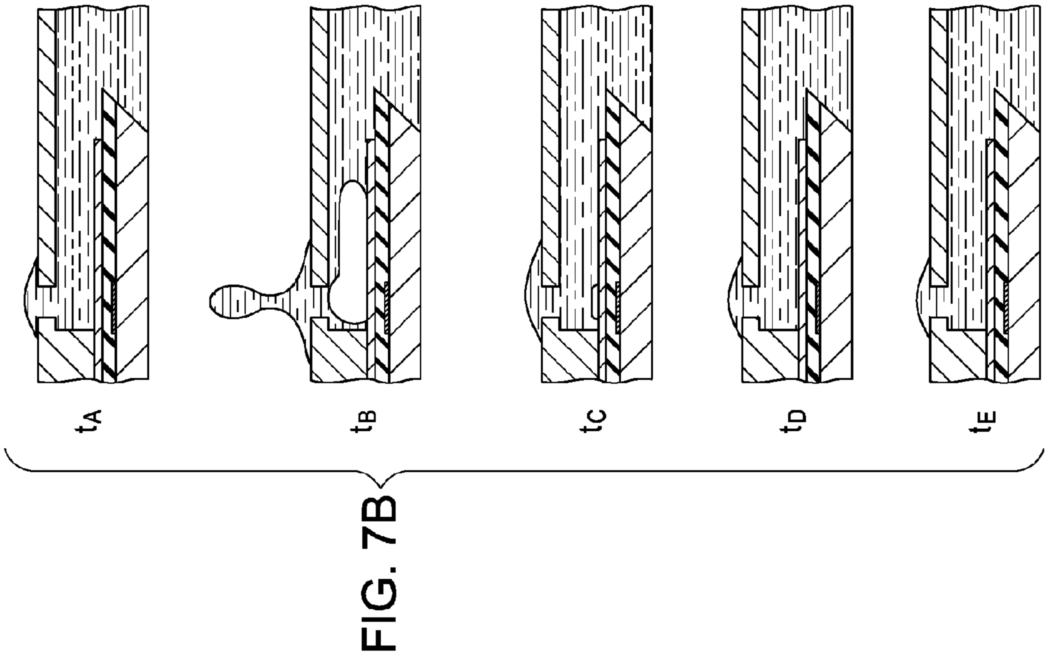
FIGS. 7A and 7B explain the behavior of ink in a passage displayed when discharging is performed in the inkjet recording head of the first embodiment.
Figure 7A:
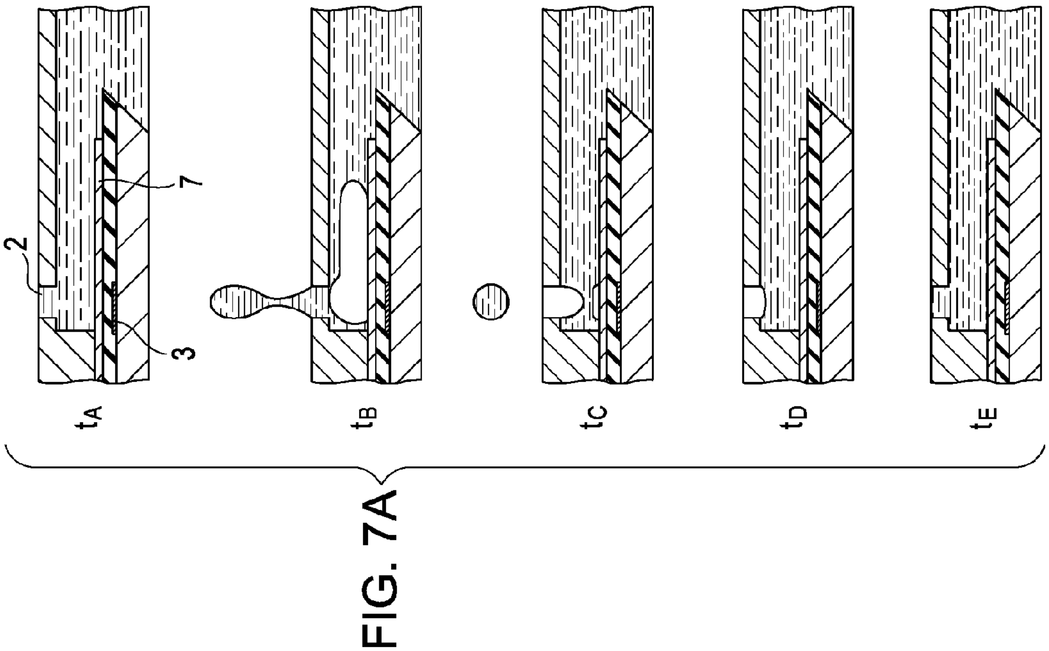

FIGS. 7A and 7B are schematic views explaining the behavior of ink exhibited in the passage during a discharging operation of the recording head in the first embodiment. FIG. 7A shows the behavior of ink in the passage during normal discharging, and FIG. 7B shows the behavior of ink in the passage in the case of defective discharging caused by covering the discharge port with extra ink.

First, the behavior of ink during normal discharging will be described with reference to FIG. 7A.

When a voltage is applied to the electrothermal transducer 15 (discharging heater 3) shown in FIG. 5, a boiling phenomenon occurs in a part of the ink in contact with the cavitation-resistant film 7 in the passage, so that a bubble grows. With this growth of the bubble, an interface of the ink bulges toward the front side of the discharge port 2, and a bubble region spreads over an area from the vicinity of the discharge port 2 to the back inner portion of the passage (see a time $t_B$ in FIG. 7A).

When the application of the pulse is completed, the formed bubble dissipates. In response to this dissipation, the bulging front part of ink separates, travels through the air, and then lands on a recording medium. Further, the remaining part of the bulging ink is drawn back into the passage by a negative pressure generated by dissipation (see a time $t_C$ in FIG. 7A).

When ink is refilled in the state at the time $t_C$ in FIG. 7A, the ink interface moves toward the vicinity of the discharge port 2. This ink flow is caused by a capillary force near the leading end of the passage. As a result, when a bubble is formed, as shown in FIG. 6B, the ink temporarily flows to the common liquid chamber 18, and then flows from the common liquid chamber 18 to the discharge port 2 after the volume of the bubble increases to its maximum.

When ink refilling is completed, a normal state at a time $t_E$ shown in FIG. 7A is brought about again. Every time a voltage is applied to the electrothermal transducer 15 (discharging heater 3), the operations from the time $t_A$ to the time $t_E$ shown in FIG. 7A are repeated.

The behavior of ink in the case of defective discharging will now be described with reference to FIG. 7B. At a time $t_A$ in FIG. 7B, the discharge port 2 is covered with extra ink. In this case, when a voltage is applied to the electrothermal transducer 15 (discharging heater 3), a bubble grows because of a boiling phenomenon, but ink separation does not occur (see a time $t_B$ and a time $t_C$ in FIG. 7B). Since ink is not discharged by the growth of the bubble in this way, the amount of ink that is reduced by an ink discharging operation is zero. For this reason, the amount of ink to be refilled is smaller and the time necessary for ink refilling is shorter than when normal discharging is performed.

When ink near the flow sensor 5 is heated in synchronization with the flow of ink in the above-described normal discharging and defective discharging operations, the temperature of the ink changes in accordance with the ink flow rate, as shown in FIG. 6D. While the ink flow rate is high during normal discharging, it is low during defective discharging. When the flow rate of the ink flowing from the common liquid chamber 18 toward the discharge port 2 is high, the temperature of the ink on the flow sensor 5 decreases significantly. In contrast, when the flow rate of the ink flowing from the common liquid chamber 18 toward the discharge port 2 is low, the decrease in the temperature of the ink on the flow sensor 5 is smaller than when the ink flow rate is high.

The voltage output from the flow sensor 5 differs in accordance with the ink flow rate. In FIG. 6E, a solid line shows a voltage output from the flow sensor 5 during normal discharging, and a broken line shows an output from the flow sensor 5 during defective discharging. During the period from the time $t_2$ to the time $t_3$, the voltage output from the flow sensor 5 differs between normal discharging and defective discharging. Therefore, by comparing the voltages $V_{out}$ output from both ends of the detecting element 17 with a threshold value $V_{out,th}$ for judgment about defective discharging in the period from the time $t_2$ to the time $t_3$, it can be judged whether defective discharging has occurred in the recording head.

A description will be given below of conditions for distinguishing between normal discharging and defective discharging in the recording head.

(1) Normal Discharging:

$$(\text{output voltage } V_{out}) \leqq (\text{threshold value } V_{out,th})$$

(2) Defective Discharging:

$$(\text{output voltage } V_{out}) > (\text{threshold value } V_{out,th})$$

Herein, it is preferable that the threshold value $V_{out,th}$ be sufficiently large so as to avoid misjudgment due to a noise signal and be sufficiently small so as to allow judgment immediately after the occurrence of defective discharging.

The output voltage $V_{out}$ and the threshold value $V_{out,th}$ are compared by the comparator circuit 37 shown in FIG. 5. The result of the comparison performed by the comparator circuit 37 is supplied to the control unit that controls the recording head. Using the comparison result, when the output voltage $V_{out}$ is more than the threshold value $V_{out,th}$, the control unit determines that ink discharging failure has occurred, and carries out a predetermined operation. The predetermined operation includes, for example, a discharging recovery operation of operating the recording head for discharging recovery, an operation of protecting the recording head, and an operation of giving the user a warning.

While the threshold value $V_{out,th}$ for judgment about defective discharging is a fixed value in the first embodiment, it may be given by a high-dimensional function using the temperature in the passage as a variable. Alternatively, a data table listing optimum threshold values $V_{out,th}$ set for the respective ink temperatures may be prepared so that an appropriate threshold value can be selected therefrom in accordance with the temperature of ink in the passage. The optimum threshold values $V_{out,th}$ are set by the control unit.

While the heat characteristic of the discharging heater is fixed in the first embodiment, a data table listing threshold values ranked in accordance with variations in the heat characteristic of the discharging heater may be prepared so that an appropriate threshold value can be selected therefrom in accordance with the rank. The appropriate threshold value is selected by the control unit.

By thus setting the optimum threshold values $V_{out,th}$ in the data table, accurate judgment about defective discharging can be made, regardless of the temperature in the passage.

Figure 8:
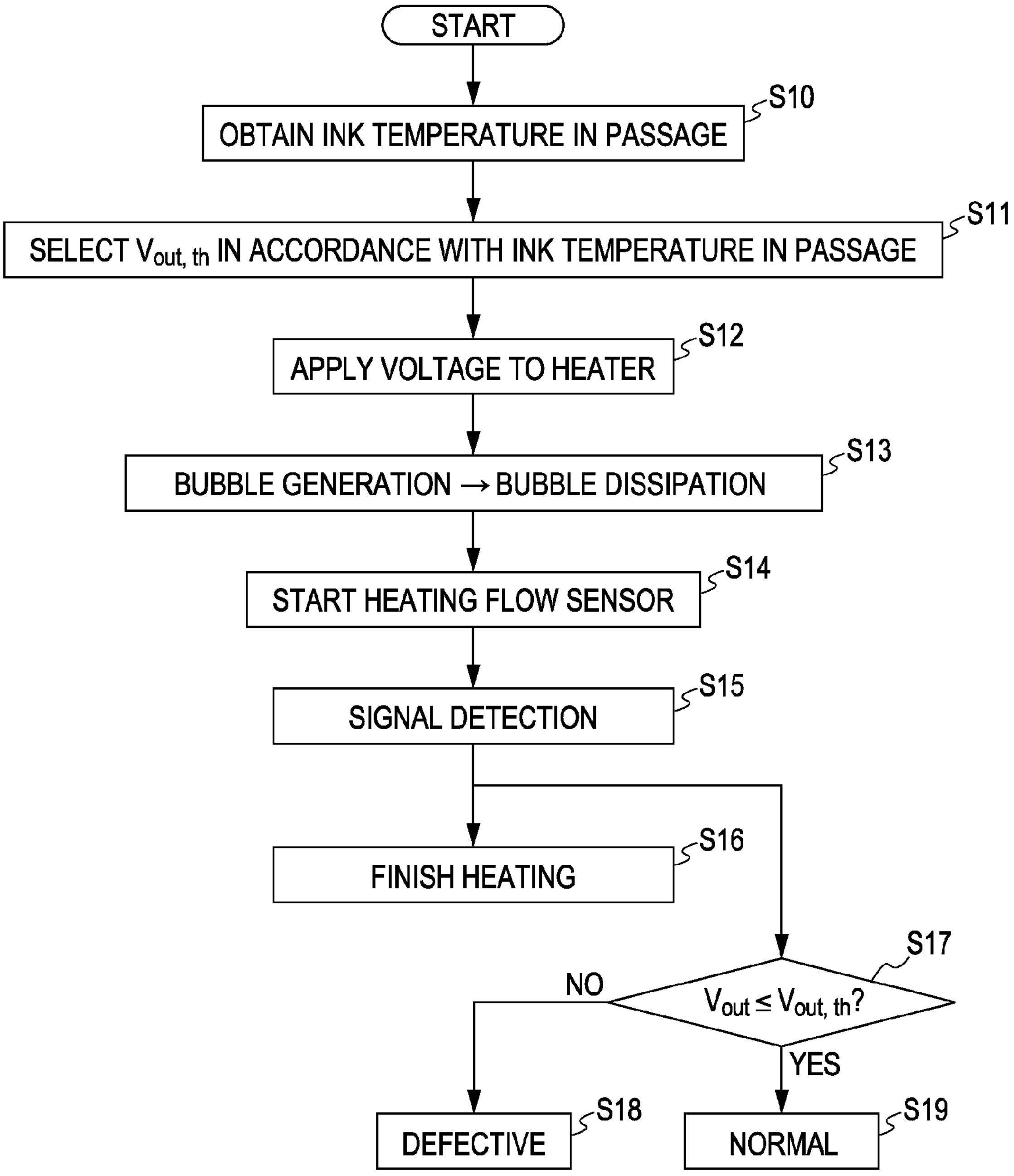
FIG. 8 is a flowchart showing a defective-discharging detecting procedure performed in the inkjet recording head of the first embodiment.

FIG. 8 is a flowchart showing a defective-discharging detecting procedure according to the first embodiment. Defective discharging is detected by using a data table listing optimum threshold values $V_{out,th}$.

First, the temperature of ink in the passage is detected with the flow sensor 5 (Step S10). For temperature detection, a data table showing the relationship between the temperature and the output voltage (or resistance) when a constant current is passed through the flow sensor 5 is created beforehand. With reference to the data table, the temperature is obtained from the output voltage of the flow sensor 5.

Next, with reference to a data table listing optimum threshold values $V_{out,th}$ to set corresponding to the ink temperatures, an optimum threshold value (threshold value $V_{out,th}$) corresponding to the detected ink temperature is selected (Step S11).

Then, a predetermined voltage is applied to the discharging heater 3 (Step S12). Heat energy is thereby applied to the ink in the passage, and a bubble is generated. By growth and contraction of the bubble (bubble generation and dissipation), ink discharging and refilling are performed (Step S13).

In conjunction with the ink flow due to bubble generation and dissipation, a first pulse current is supplied to the flow sensor 5 (Step S14). Then, a second pulse current is supplied to the flow sensor 5, an output voltage $V_{out}$ in this case is detected (Step S15), and the ink heating operation with the flow sensor 5 is completed (Step S16).

Subsequently, the output voltage $V_{out}$ obtained in Step S15 and the threshold value $V_{out,th}$ selected in Step S11 are compared (Step S17). When the output voltage $V_{out}$ is more than the threshold value $V_{out,th}$, it is determined that ink discharging failure has occurred (Step S18). When the output voltage $V_{out}$ is less than or equal to the threshold value $V_{out,th}$, it is determined that ink discharging is normal (Step S19).

In the recording head according to the first embodiment, the flow of ink in the passage produced when ink is discharged (ink flow produced by refilling) is detected. The ink flow is smaller when discharging failure occurs than when discharging is normal. By utilizing the difference in magnitude of ink flow, discharging failure of ink can be detected.

Since the magnitude of ink flow in the case of discharging failure has a sufficiently distinguishable difference from that in normal discharging, it is possible to accurately distinguish between the normal discharging state and the defective discharging state.

Since the detection accuracy is not reduced by an external influence, unlike the optical defective-discharging detecting unit, accurate detection is possible.

Since the ink flow can be detected at each discharge port, judgment about defective discharging can be made for each discharge port in the recording head.

Since judgment about defective discharging can be made during the normal discharging operation, the throughput of the recording apparatus is higher than that of a recording apparatus having an optical defective-discharging detecting unit.

While judgment about defective ink discharging is made during printing in the first embodiment, it may be made between successive printing operations on printing media. Alternatively, defective discharging may be automatically detected after a predetermined time.

Second Embodiment

An inkjet recording head according to a second embodiment has a basic configuration similar to that of the recording head of the first embodiment except in an operation of detecting defective discharging with a flow sensor. The inkjet recording head of the second embodiment also includes an ink-flow detector (ink-flow detecting unit) similar to that shown in FIG. 5.

Figures 9A, 9B, 9C, 9D, 9E:
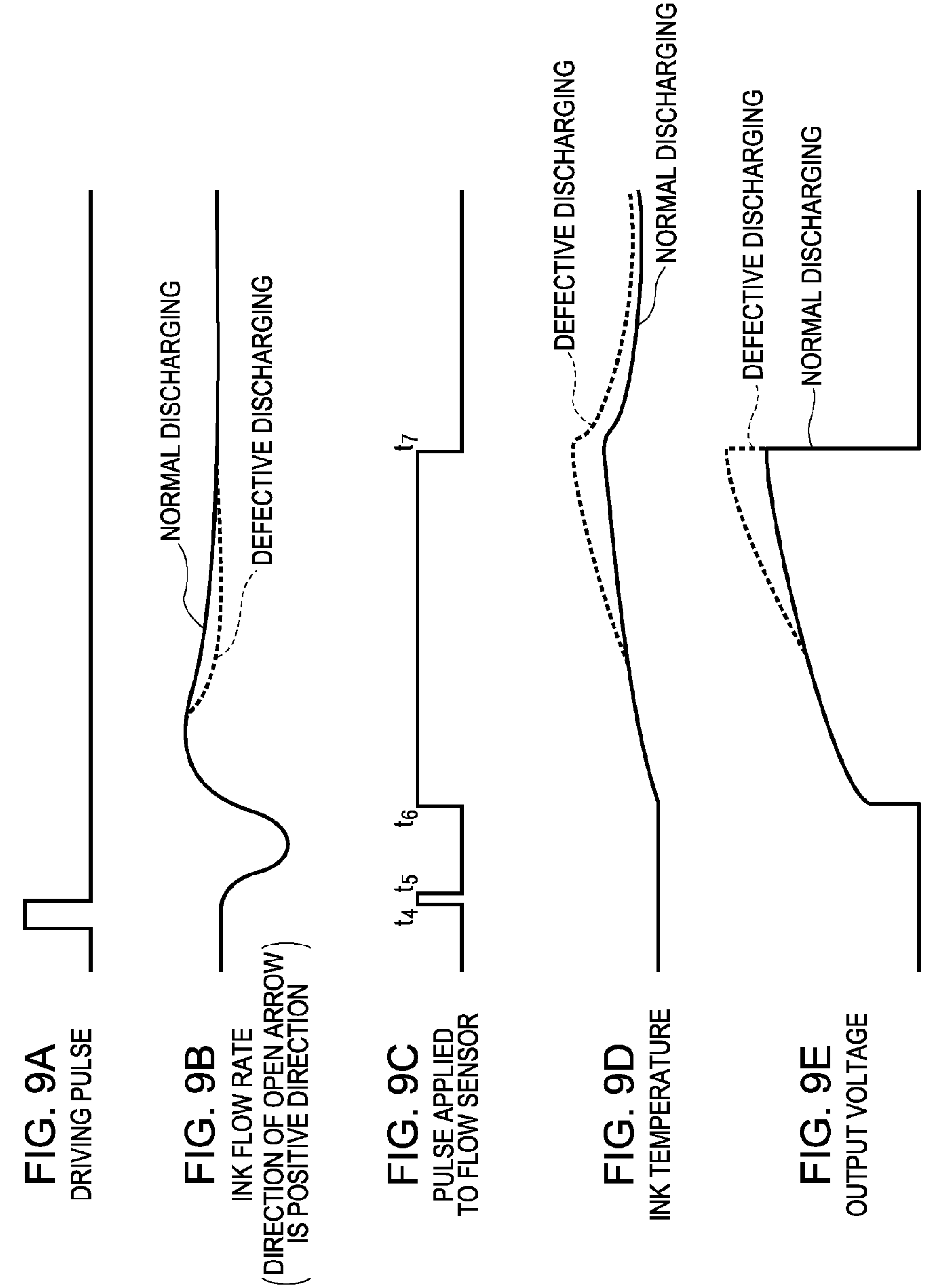
FIGS. 9A to 9E explain the principle of operation of a flow sensor in an inkjet recording apparatus according to a second embodiment of the present invention.

FIGS. 9A to 9E explain the principle of operation of the ink-flow detector. FIG. 9A is a waveform chart of the voltage applied to the electrothermal transducer 15. FIG. 9B shows the change in ink flow rate on the time axis when the direction from the common liquid chamber 18 to the discharge port 2 shown in FIG. 1 is a positive direction. FIG. 9C is a waveform chart of the current applied to the detecting element 17. FIG. 9D shows the change in temperature on the time axis of ink on the detecting element 17. FIG. 9E is a waveform chart of the detected output voltage in accordance with the changes in ink flow rate and ink temperature shown in FIGS. 9B and 9D.

As shown in FIG. 9C, a pulse current supplied to the detecting element 17 includes a pulse that has a short pulse width P3 and that is high during a period between a time $t_4$ and a time $t_5$, and a pulse that has a long pulse width P4 (>P3) and that is high during a period between a time $t_6$ and a time $t_7$. The pulse having the pulse width P3 and the pulse having the pulse width P4 are supplied at a predetermined interval. The period between the time $t_4$ and the time $t_5$ where the pulse current having the pulse width P3 is applied is a detecting period for measuring the temperature of ink near the detecting element 17. The period between the time $t_6$ and the time $t_7$ when the pulse current having the pulse width P4 is applied is a detection time for detecting the ink flow by measuring the change in resistance of the detecting element 17 while heating the ink near the detecting element 17.

As shown in FIG. 9B, the ink flow rate differs between normal discharging and defective discharging. When ink near the detecting element 17 is heated in synchronization with the ink flow, the temperature of the ink on the detecting element 17 changes, as shown in FIG. 9D. In FIG. 9D, a solid line shows the change in temperature made when the ink flow rate is high, and a dotted line shows the change in temperature made when the ink flow rate is low.

When the ink flow rate is high, the amount of increase in temperature of the ink on the detecting element 17 is small. In contrast, when the ink flow rate is low, the ink on the detecting element 17 stays for a long time without flowing, and therefore, is continuously heated by the detecting element 17. As a result, the amount of increase in the ink temperature is larger than when the ink flow rate is high. Therefore, as shown in FIG. 9E, the output voltage from the detecting element 17 differs when the flow rate is high (solid line) and when the flow rate is low (dotted line) during the period from the time $t_6$ to the time $t_7$.

By comparing the output voltage $V_{out}$ at both ends of the detecting element 17 (flow sensor) and the threshold value $V_{out,th}$, judgment is made about defective discharging of the recording head. The conditions for distinguishing between normal discharging and defective discharging are similar to those adopted in the first embodiment. The threshold value $V_{out}$ for judgment about defective discharging may be changed in accordance with the temperature of ink in the passage measured during the period from the time $t_4$ to the time $t_5$.

The recording head according to the second embodiment provides advantages similar to those of the recording head of the first embodiment.

Third Embodiment

Figure 10:
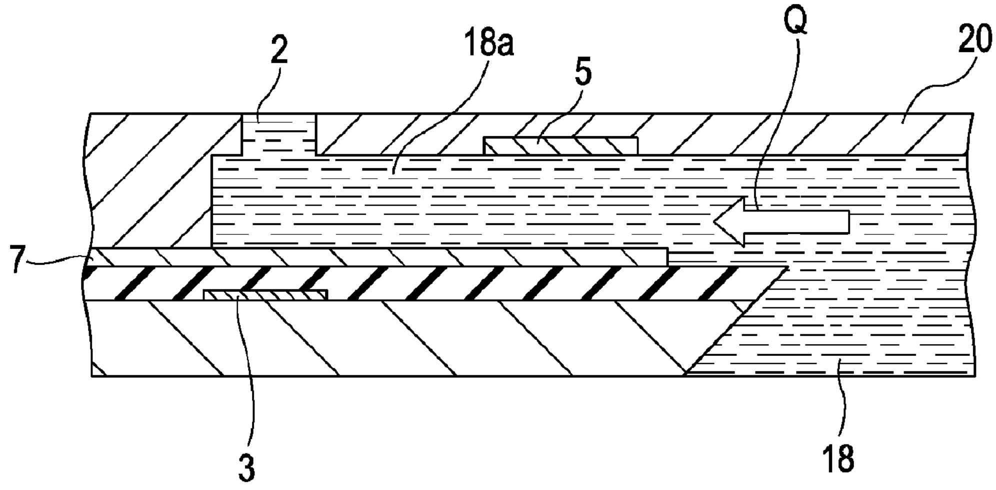
FIG. 10 is a partial sectional view of an inkjet recording head according to a third embodiment of the present invention.

FIG. 10 is a partial sectional view of an inkjet recording head according to a third embodiment of the present invention. In this recording head, a nozzle forming member 20 that defines a passage by being combined with a heater board (head substrate) is not formed of an organic material, but of silicon (Si). In this nozzle forming member 20, a flow sensor 5 serving as an ink flow-rate detecting element is formed by a film deposition process similar to the process for a semiconductor. Other structures are similar to those adopted in the first embodiment.

The flow sensor 5 may have a meandering shape in order to increase the resistance, or may have a square shape.

The inkjet recording head of the third embodiment also includes an ink-flow detector having a configuration similar to that shown in FIG. 5. The ink-flow detector operates in a manner similar to that adopted in the first embodiment.

Since the flow sensor 5 is provided apart from a discharging heater 3 in the third embodiment, it is not susceptible to heat generated by bubble generation. Therefore, it is possible to more accurately detect the ink flow.

Fourth Embodiment

Figure 11:
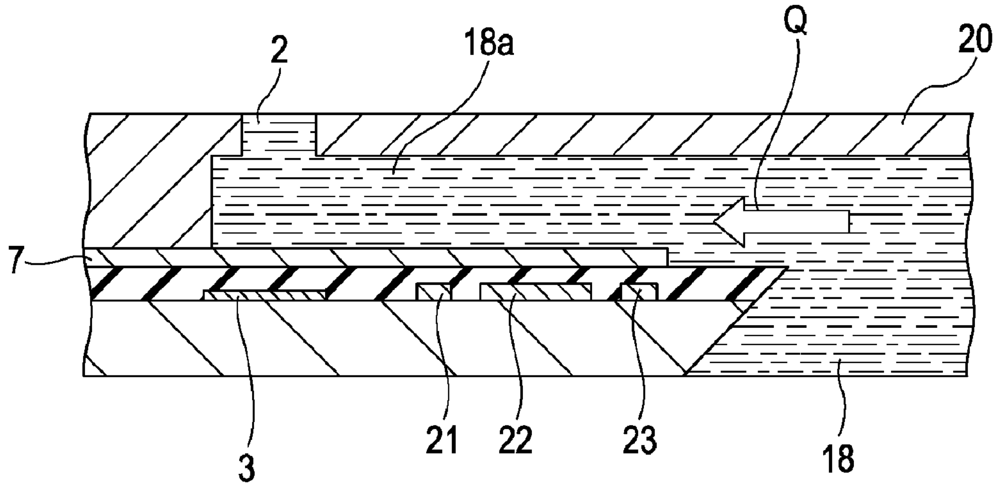
FIG. 11 is a partial sectional view of an inkjet recording head according to a fourth embodiment of the present invention.

FIG. 11 is a partial sectional view of an inkjet recording head according to a fourth embodiment of the present invention. The inkjet recording head of the fourth embodiment has a configuration similar to that adopted in the first embodiment except in the structure of a detecting element.

The detecting element includes flow sensors 21 and 23 (first and second resistors) and a heater 22 (heating element). The flow sensor 21, the heater 22, and the flow sensor 23 are provided between a discharging heater 3 for generating a bubble in ink and a common liquid chamber 18 in a region below a passage 18*a*. The flow sensors 21 and 23 are arranged symmetrically with respect to the heater 22.

When ink flows in the direction of arrow Q in FIG. 11, the flow sensor 23 is provided upstream from the ink flow, and the flow sensor 21 is provided downstream from the ink flow. The heater 22 is interposed between the flow sensors 21 and 23.

The operation of the flow sensors 21 and 23 in the fourth embodiment will now be described.

In a case in which the heater 22 is controlled at a temperature higher than the ambient temperature, a temperature distribution in the direction of arrow Q is symmetrical with respect to the heater 22 when there is no ink flow. When ink in the passage 18*a* moves in the direction of arrow Q, ink is supplied from the common liquid chamber 18 onto the upstream flow sensor 23. By this ink supply, an upper portion of the flow sensor 23 is cooled. On the other hand, heat conduction from the heater 22 to an upper portion of the downstream flow sensor 21 is promoted by the ink flow, and therefore, the temperature of the upper portion of the flow sensor 21 increases. As a result, a temperature difference is formed between the flow sensors 21 and 23. By converting the temperature difference into a voltage, an output voltage in accordance with the flow rate is obtained. On the basis of the output voltage, the ink flow rate can be detected.

Figures 12A, 12B, 12C, 12D, 12E:
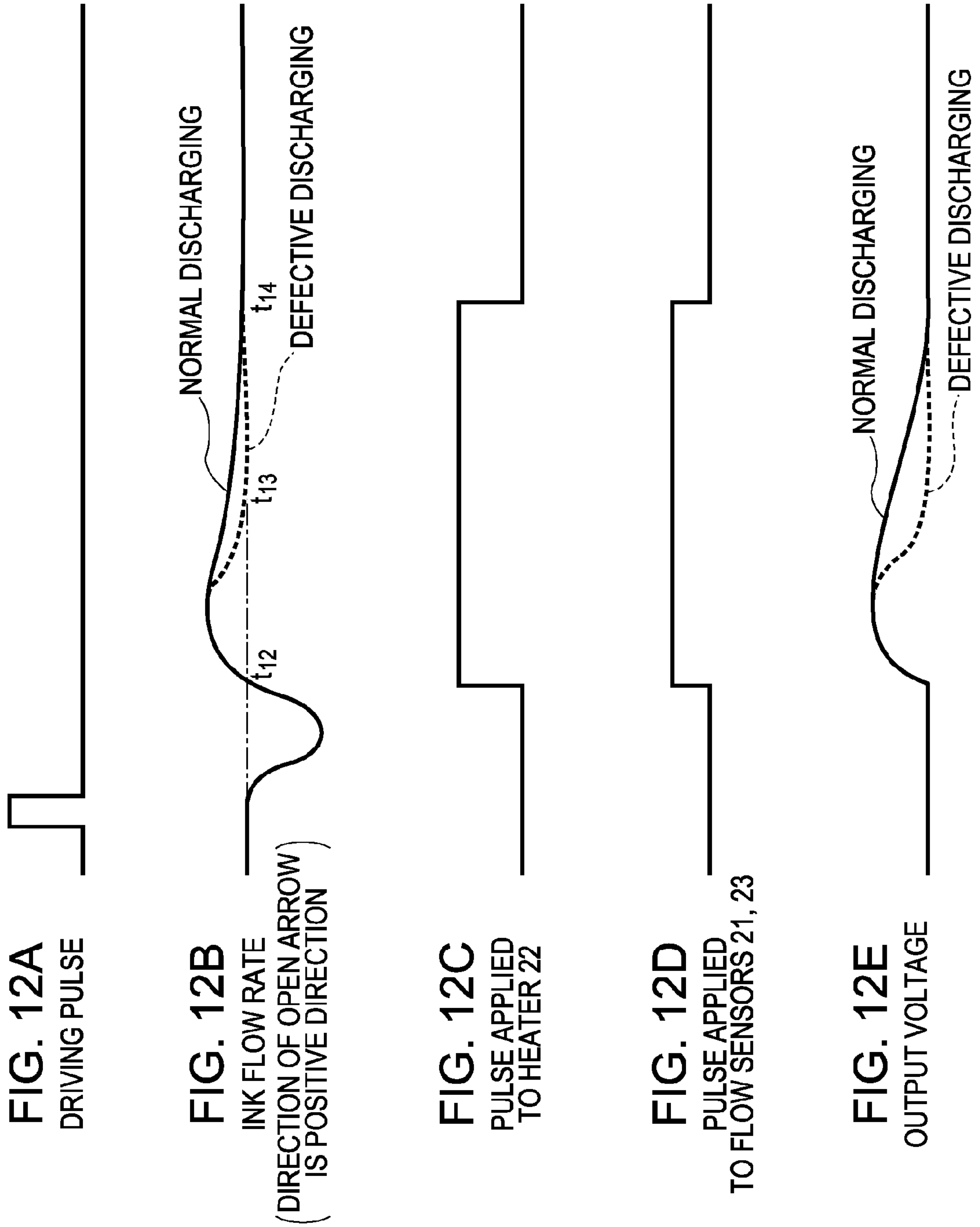
FIGS. 12A to 12E explain the principle of operation of a detecting element used in the inkjet recording head of the fourth embodiment.

FIGS. 12A to 12E explain the principle of operation of the detecting element. FIG. 12A is a waveform chart of the voltage applied to the discharging heater 3. FIG. 12B shows the change in ink flow rate on the time axis when the direction from the common liquid chamber 18 to the discharge port 2 is a positive direction. FIG. 12C is a waveform chart of the current applied to the heater 22. FIG. 12D is a waveform chart of the current applied to the flow sensors 21 and 23. FIG. 12E shows a detected output voltage on the time axis obtained by subtracting the output voltage of the flow sensor 23 from the output voltage of the flow sensor 21.

As shown in FIG. 12B, the ink flow rate in normal discharging is different from that in defective discharging during a period between a time $t_{13}$ and a time $t_{14}$. During a period from a time $t_{12}$ to the time $t_{14}$, the heater 22 is controlled at a high temperature that does not generate a bubble in the ink in synchronization with ink refilling, and a temperature difference between the flow sensors 21 and 23 is measured during the period. A detected output voltage $V_{out}$ is calculated from a voltage difference formed by the temperature difference between the flow sensors 21 and 23. By comparing the detected output voltage $V_{out}$ with a threshold value $V_{out,th}$, judgment is made about defective discharging. The conditions for distinguishing between normal discharging and defective discharging are similar to those adopted in the first embodiment.

As described above, defective discharging can be detected, regardless of the temperature in the passage.

In the fourth embodiment, the two flow sensors 21 and 23 are arranged symmetrically with respect to the heater 22. This allows more accurate and more stable detection of the flow rate.

The recording head of the fourth embodiment also provides advantages similar to those of the recording head of the first embodiment.

Fifth Embodiment

Figure 13:
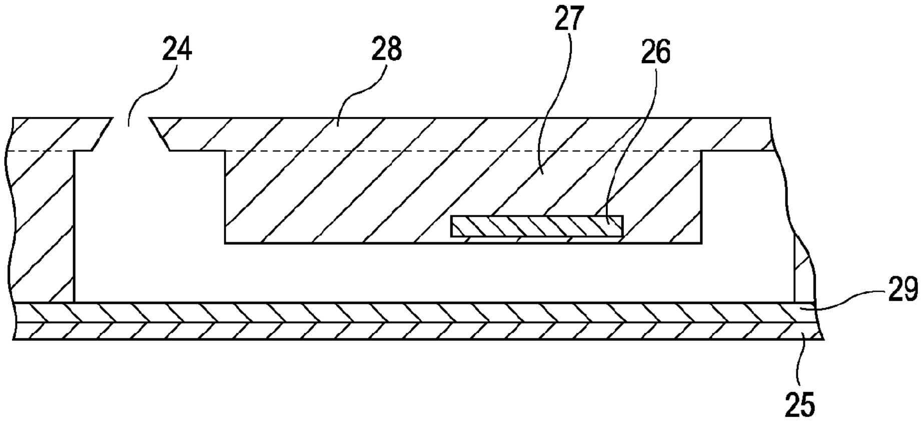
FIG. 13 is a partial sectional view of an inkjet recording head according to a fifth embodiment of the present invention.

FIG. 13 is a partial sectional view of an inkjet recording head according to a fifth embodiment of the present invention.

The inkjet recording head of the fifth embodiment is a piezo recording head, and includes a nozzle plate 28 having a plurality of discharge ports 24, a vibrating plate 29 having piezoelectric elements provided corresponding to the discharge ports 24, and a liquid-chamber capacity control portion 25 for controlling the vibrating plate 29. The piezoelectric elements are discharging-energy generating elements that generate energy for discharging ink from the discharge ports 24, and can adjust the capacity of a liquid chamber communicating with the discharge ports 24.

The nozzle plate 28 is provided with a base 27 including flow sensors 26 serving as detecting elements. By coupling the nozzle plate 28 having the base 27 to a substrate having the vibrating plate 29, a plurality of passages are formed. Each passage communicates with the liquid chamber. By applying a driving signal corresponding to recording information to the liquid-chamber capacity control portion 25, ink is discharged from the discharge ports 24. The flow sensors 26 are formed as film-shaped sensors by the same film deposition process as that for the base 27.

In addition to the above-described structure, the inkjet recording head of the fifth embodiment also includes a defective-discharging detecting unit (not shown) that detects defective ink discharging of the discharge ports 24 with the flow sensors 26 provided corresponding to the discharge ports 24. The defective-discharging detecting unit detects the flow of ink by measuring the change in resistance of the flow sensor 26 while heating ink near the flow sensor 26 by the application of a voltage.

In the inkjet recording head of the fifth embodiment, a large amount of ink is refilled in response to the amount of discharged ink in the case of normal discharging. In contrast, in the case of defective discharging, the ink flow is smaller than in normal discharging. Therefore, ink near the flow sensor 26 is not heated easily. Accordingly, judgment can be made about defective discharging of the recording head by detecting the temperature difference of ink near the flow sensor due to the difference in ink flow rate between normal discharging and defective discharging and comparing the voltage corresponding to the detected temperature difference with a threshold value for judgment about defective discharging. This judgment is performed in a procedure similar to that adopted in the first embodiment.

The recording head of the fifth embodiment also provides advantages similar to those of the recording head of the first embodiment.

While the present invention is applied to the recording head used in a serial printer in the above-described embodiments, it is not limited thereto. The present invention is also applicable to a so-called full-multi type recording head used in a line printer in which discharge ports are arranged in line over the entire width of a recording medium. In particular, since this recording head is long because multiple discharging heaters are arranged, the present invention can be effectively and easily applied thereto.

The configurations of the above-described embodiments can be combined appropriately. For example, the detecting element (flow sensor 21, heater 22, and flow sensor 23) used in the fourth embodiment can be applied to the detecting elements in the other embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-254449 filed Sep. 28, 2007, which is hereby incorporated by reference herein in its entirety.

What is claimed is:

1. A method of detecting a discharging state of an inkjet head comprising a passage communicating with a discharge port for discharging ink, an energy generating element, provided in the passage, for generating energy to discharge ink from the discharge port, and a detecting unit, provided in the passage, the method comprising:

supplying power to the energy generating element;

applying a first pulse current having a predetermined pulse width to the detecting unit so as to heat ink in the passage, after supplying power to the energy generating element;

applying a second pulse current having a pulse width smaller than the predetermined pulse width to the detecting unit, after applying the first pulse current; and measuring an output signal from the detecting unit in response to the second pulse current and comparing a value of the output signal with a threshold value, so as to measure a temperature of the ink in the passage.

2. The method according to claim 1, wherein the temperature of the ink is measured while the ink in the passage is flowing toward the discharge port.

3. The method according to claim 1, wherein the value of the output signal measured in the measuring step is a voltage of the output signal.

4. The method according to claim 1, further comprising determining an initial temperature of the ink in the passage before applying the first pulse current and determining the threshold value based on the initial temperature of the ink.

5. The method according to claim 1, wherein the first pulse current and the second pulse current each have a waveform of a single pulse.

* * * * *